Feb. 10, 1931.    H. STACKS    1,791,647
ADJUSTABLE SHADE AND ROLLER THEREFOR
Filed Dec. 9, 1929

INVENTOR.
Homer Stacks
BY
ATTORNEY.

Patented Feb. 10, 1931

1,791,647

UNITED STATES PATENT OFFICE

HOMER STACKS, OF DETROIT, MICHIGAN

ADJUSTABLE SHADE AND ROLLER THEREFOR

Application filed December 9, 1929. Serial No. 412,634.

My invention relates to a new and useful improvement in an adjustable shade and roller therefor. The invention is intended primarily as a shade for an open seat of an automobile such as a rumble seat and inasmuch as different types of vehicles are made of different widths, requiring different widths of shades or covers, it is desirable that a device may be formed adjustable to the various sizes.

It is an object of the present invention to provide a shade of this class and a roller therefor which may be easily and quickly adjusted to various sizes.

Another object of the invention is the provision of a roller of this class which will automatically adjust itself and retain itself in mounted position on the supporting brackets.

Another object of the invention is the provision of a roller comprising a pair of telescoping parts mounted in non-rotative relation and easily slidable.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of the invention.

Figure 1:
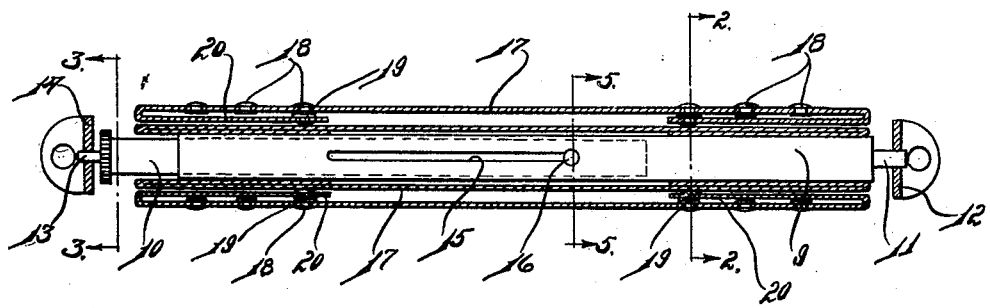
Figure 2:
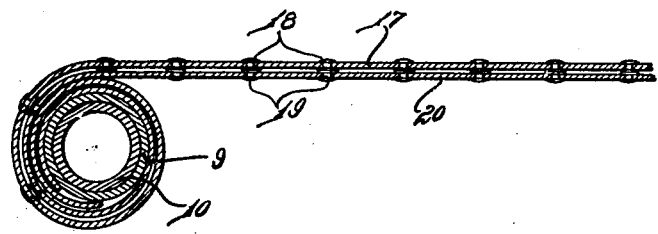
Fig. 2 is a sectional view taken on line 2—2 of Fig. 1.
Figure 3:
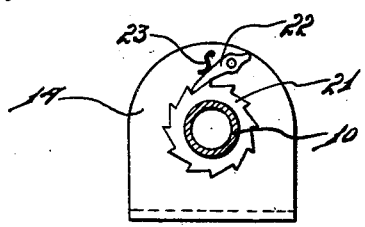
Fig. 3 is a view taken on line 3—3 of Fig. 1.
Figure 4:
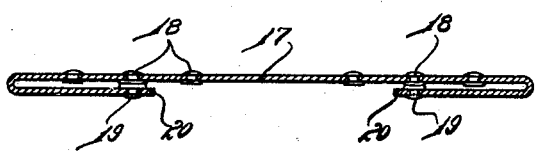
Fig. 4 is a sectional view illustrating the shade or cover used in the invention.
Figure 5:
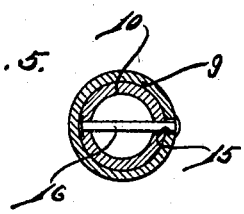
Fig. 5 is a sectional view taken on line 5—5 of Fig. 1 with the shade or cover removed.

As shown in the drawings the roller comprises a pair of telescoping parts 9 and 10. A trunnion 11 projects outwardly from the end of the section 9 and is adapted to engage the supporting bracket 12. A trunnion 13 projects outwardly from the end of the section 10 to engage the supporting bracket 14. An elongated longitudinally extending slot 15 is formed in the section 9 and a pin 16 secured to the section 10 projects therethrough.

A cover 17 made from suitable flexible material is adapted to be wound on the roller thus formed and for this purpose is suitably attached to the roller. Female portions 18 of snap fasteners are mounted on the member 17 in spaced rows and mounted on the edge portion 20 which may be turned over is a row of male portions 19 of snap fasteners. A spring 24 will serve to maintain the sections 9 and 10 in such a position that when positioned between the brackets 12 and 14 the shade roller will be maintained in mounted position. When the end of the cover or shade 17 is secured in proper position the roller may then be rotated to draw this shade or cover into taut condition and a ratchet wheel 21 is engaged by the pawl 22 which is held by the spring 23 in engagement therewith so that a loosening of the cover will be prevented.

By folding the edges 20 and the cover 17 inwardly to the desired position the cover 17 may thus be adjusted to a width corresponding to the length of the roller.

In this way there is provided a shade or cover together with a co-operating roller which may be used on various widths of structures.

While I have illustrated and described the preferred form of structure of my invention, I do not wish to limit myself to the precise details of structure shown but desire to avail myself of such variations and modifications as may come within the scope of the appended claims.

Having thus described my invention, what I claim as new and desire to secure by Letters Patent is:

1. An adjustable shade roller of the class described, comprising: a pair of telescoping roller forming members axially movable of each other and relatively non-rotatable; a flexible shade member mounted on said roller forming members, said shade member being of greater width than the normal combined length of said roller forming members and foldable upon itself at opposite edges; and means for securing the opposite edges of said shade member in folded over relation.

2. An adjustable shade roller of the class described, comprising: a pair of telescoping roller forming members axially movable of each other and relatively non-rotatable; a flexible shade member mounted on said roller forming members, said shade member being of greater width than the normal combined length of said roller forming members and foldable upon itself at opposite edges; and means for securing the edges of said shade forming member in folded over relation in various positions.

In testimony whereof I have signed the foregoing specification.

HOMER STACKS.